Oct. 13, 1925.  
J. FLORENCE  
FAUCET  
Filed Jan. 28, 1924  
1,556,923
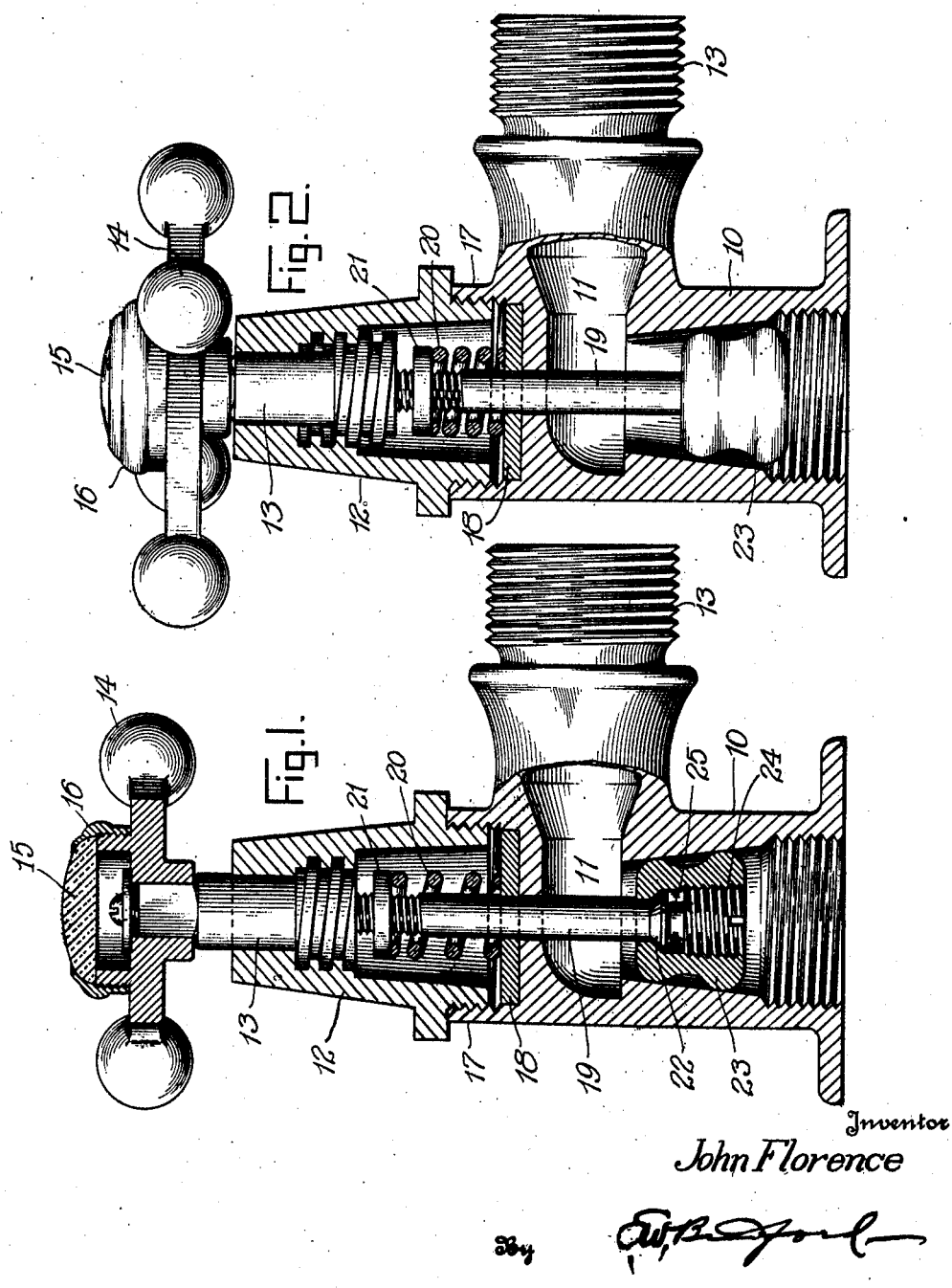
Inventor  
John Florence Patented Oct. 13, 1925.

1,556,923

UNITED STATES PATENT OFFICE.

JOHN FLORENCE, OF INDIANAPOLIS, INDIANA.

FAUCET.

Application filed January 28, 1924. Serial No. 689,179.

*To all whom it may concern:*

Be it known that I, JOHN FLORENCE, a citizen of the United States, residing at Indianapolis, in the county of Marion and State of Indiana, have invented certain new and useful Improvements in Faucets, of which the following is a specification.

My said invention relates to a faucet and is concerned particularly with cores or valves such as are used in the cocks for spring actuated valves of the type commonly found in kitchen sinks, bath tubs, basins, etc. It is an object of my invention to form the core or valve body in such a manner as to provide a metallic seating contact between the core and the body of the cock, the core being preferably of the same metal as the body of the cock or of a metal having similar hardness and similar wearing properties.

Another object of the invention is to provide a double line of seating contact on a core or valve which shall be self cleaning and self grinding whereby the faucet may always close tight.

Another object of the invention is to provide a core or valve in which the tenency to corrode shall be minimized by reducing to a minimum the areas of seating contact.

Referring to the accompanying drawings, which are made a part hereof and on which similar reference characters indicate similar parts, Figure 1 is a vertical central section of my device, the parts being shown in closed position, and Figure 2 is a similar view with the faucet open to permit the flow of water or other fluid.

In the drawings reference character 10 indicates the body of the cock on which the remaining parts are supported. Said cock has a passage 11 extending upward and then laterally in usual manner, the passage being threaded for attachment to other fixtures. At the outer end a conical fixture 12 is threaded to the cock, this fixture being hollow at its lower end and having threads with which a stem 13 engages, said stem having a handle 14 of conventional form at its upper end on which is a disk 15 of porcelain or the like held in place by a nut 16.

The cock has an upwardly extending flange 17 which is internally threaded to receive the fixture 12 and a washer 18 fits within the flange and fits closely about a central opening in which a stem 19 is movably supported said stem fitting closely in said opening and in the central opening of the washer 18. A spring 20 is positioned about the stem between the washer 18 and a nut 21 on the stem said nut serving for adjustment of the tension of the spring. The stem 13 is adapted to bear on the upper end of the stem 19 to move it in opposition to the spring.

The stem has a head 22 which as here shown is at the lower end of the stem. A core or valve 23 is carried by the stem said core being hollow at its lower end to permit the stem to be located in the core after which it may be introduced at the bottom of the faucet and moved upward into the position shown. A cap screw 24 is held in position in the core by internal threads on the same and this cap screw has a projection 25 extending almost up to the head 22 but leaving a slight clearance between the parts for lost motion between the stem and the core. The core is of a general frusto-conical form to fit the frusto-conical interior surface of the cock. In the preferred form of the invention however I shape the sides of the core so as to leave upper and lower rounded annular parts convex in section while the intermediate part is concave in section. In this way I provide for approximate line contact with the inner surface of the cock at the upper and lower ends of the core thereby affording a minimum opportunity for corrosion and a maximum opportunity for a tight fit.

In the use of my device the parts will assume the position shown in Figure 1 when the device is closed, the spring pressing against the nut 21 to force the stem upward thereby carrying the core 23 into close engagement with the inner wall of the cock. It will be understood that the parts will be so formed as to permit the stem 13 to be moved up far enough to permit the necessary close engagement between the core and the adjoining wall. When the faucet is to be opened the handle 14 will be turned forcing the stems 13 and 19 down whereupon the head 22 will engage the projection 25 and then force the core downward out of engagement with the inner wall of the cock. The water or other fluid can then pass up and laterally out of the faucet. In doing so it will naturally tend to impart a rotary or whirling motion to the core which is loosely mounted on or articulated with the stem whereby the device will clean itself and whereby also the wear on all sides will be equalized so as to do away with any possible inequality such as would permit leakage due to imperfect closure of the faucet.

Various minor changes such as will be obvious to those skilled in the art may be made in the device of my invention without departing from the spirit thereof and therefore I do not limit myself to what is shown in the drawings and described in the specification but only as indicated in the appended claims. It will be obvious also that the use of my device is not confined to spring actuated faucet valves but elements embodying the principles thereof may be used in other devices.

Having thus fully described my said invention what I claim as new and desire to secure by Letters Patent, is:

1. In a faucet, a frusto-conical valve, the periphery of said valve having upper and lower annular convex surfaces and being provided with an annular concave surface joining said convex surfaces, substantially as set forth.

2. A faucet comprising a body having a fluid passage, an opening in alignment with said passage, a valve stem extending through said opening closely fitting the wall of the same and projecting into said passage, a valve mounted on the inner end of said valve stem adapted to contact with the sides of said passage, said valve having a periphery with upper and lower convex surfaces joined by a concave surface, an abutment adjustably carried on the outer end of said valve stem, a spring confined between said abutment and said faucet body, a cap enclosing the end of said stem, and an operating element adjustably carried by said cap, substantially as set forth.

In witness whereof, I have hereunto set my hand and seal at Indianapolis, Indiana, this 25 day of January, A. D. nineteen hundred and twenty-four.

JOHN FLORENCE. [L. S.]